United States Patent [19]
Hoodenpyle

[11] 3,857,579
[45] Dec. 31, 1974

[54] CART FOR MOVING TELEVISION, HI-FI CABINETS AND THE LIKE

[76] Inventor: James A. Hoodenpyle, 910 Pershing Ave., San Jose, Calif. 95126

[22] Filed: Apr. 6, 1973

[21] Appl. No.: 348,677

[52] U.S. Cl............ 280/47.2, 280/47.27, 280/47.34
[51] Int. Cl............................................. B62b 1/08
[58] Field of Search............ 280/47.27, 47.2, 47.24, 280/47.26, 47.34, 79.1

[56] References Cited
UNITED STATES PATENTS

| | | | |
|---|---|---|---|
| 402,341 | 4/1889 | Martin | 280/47.34 X |
| 2,820,643 | 1/1958 | Cohn | 280/47.2 X |
| 3,047,305 | 7/1962 | Kleinschmidt | 280/79.1 X |
| 3,166,339 | 1/1965 | Earley | 280/47.26 X |
| 3,276,550 | 10/1966 | Honeyman | 280/47.27 X |

Primary Examiner—David Schonberg
Assistant Examiner—John A. Pekar
Attorney, Agent, or Firm—Julian Caplan

[57] ABSTRACT

A cart has an L-shaped main frame with triangular sides along the shorter side of the frame and a handle extending transversely across the cart at the extremity of the longer end. An axle at the corner where the two ends of the frame meet supports large ground wheels on either side. There are casters adjacent the extremities of both ends and handles immediately inside and slightly below the casters. The cart accepts large cabinets, such as television and hi-fi sets, as well as smaller objects, and enables one man to load and unload the sets, move the load up and down stairs and onto the beds of trucks and negotiate abrupt turns in narrow passageways.

4 Claims, 6 Drawing Figures

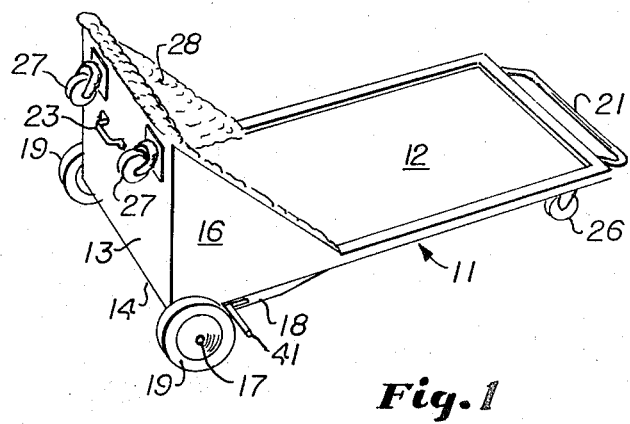
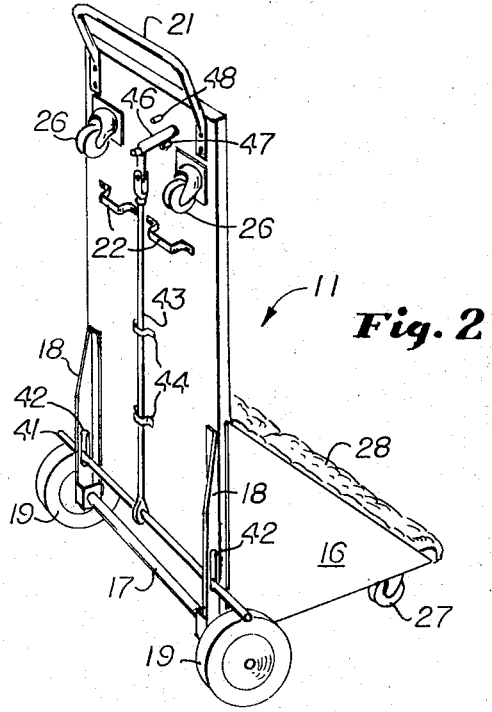
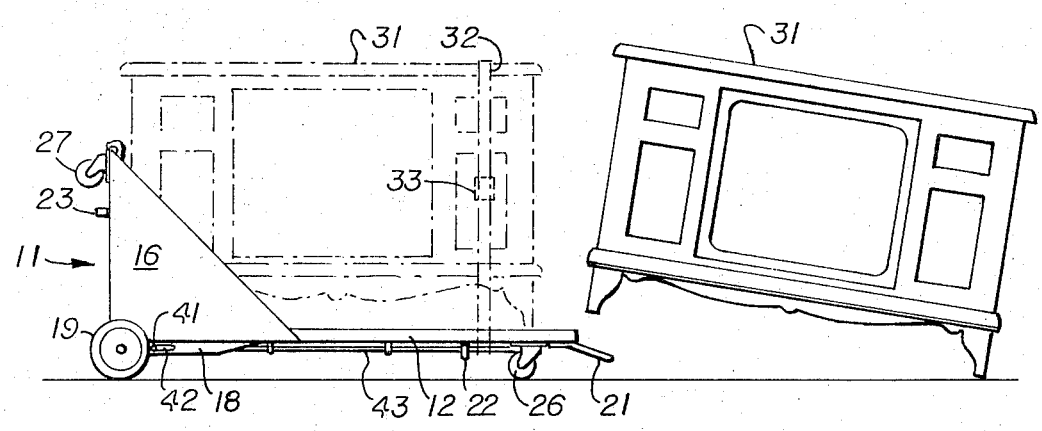
Fig. 1
Fig. 2
Fig. 3

3,857,579

CART FOR MOVING TELEVISION, HI-FI CABINETS AND THE LIKE

This invention relates to a new and improved cart for moving television, hi-fi cabinets and the like. The invention is characterized by the fact that larger loads are moved with less danger of damage to the apparatus and harm to the personnel. Smaller objects may also be transported.

In accordance with the present invention, one man can both load and move large, heavy items thereby eliminating the need for an extra man in moving heavy, cumbersome apparatus.

Another feature of the invention is the fact that the construction of the cart permits handling a wide variety of apparatus.

A feature of the invention, hereinafter explained in detail, is the fact that the car may be used to move equipment through doorways, around sharp corners in passageways, up and down stairs and into and out of trucks and station wagons.

Still another advantage of the invention is the fact that a set may be strapped to the cart while the dolly is being used to move the set or when the set is inside a truck. A single strap may be used to secure the set to the cart. In such condition, when the set is in a truck, there is less danger of the set being damaged by tipping, and hence the likelihood of damage to the set is reduced. Further, the sides of the cart reduce the change of damage to the set. Padding used on the ends protects the objects transported from scratching and pads against shock.

Other objects of the present invention will become apparent upon reading the following specification and referring to the accompanying drawings in which similar characters of reference represent corresponding parts in each of the several views.

In the drawings:

FIG. 1 is a perspective view of the cart shown in one position.

FIG. 2 is another perspective view of the cart shown in another position.

FIG. 3 is a schematic side elevational view showing loading of a television console on to a cart.

Figure 4:
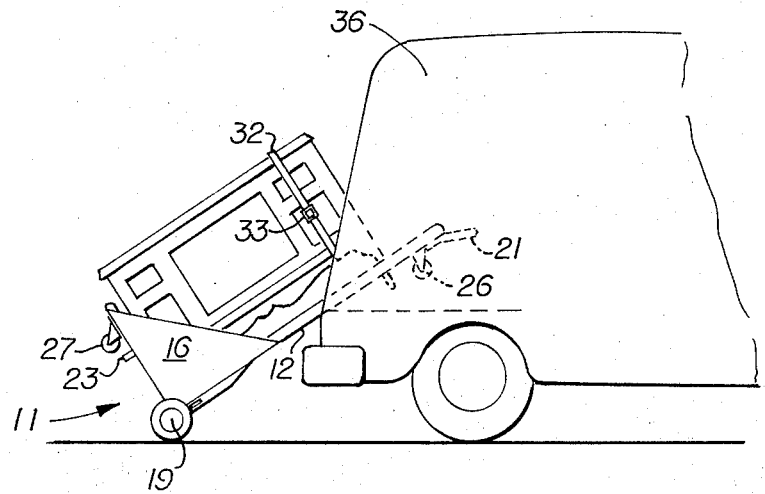
FIG. 4 is another schematic elevational view showing the cart used to load or unload equipment from truck.

Construction of the cart 11 is best shown in FIGS. 1 and 2. A longer end 12 and a shorter end 13 are disposed at right angles to each other, end 12 being approximately twice as long as the end 13. Ends 12 and 13 meet at a corner 14. Triangular sides 16 (at 45°) extend across corner 14 from the outer ends of ends 13. The width and length of the ends are selected to accommodate the largest equipment to be hauled. Adjacent corner 14 on the lower end of the larger end 12 is a transverse axle 17 journaled in reinforcements 18 which are fixed to the back of larger end 12. Reinforcements 18 may consist of angle bars and the upper ends thereof (as best shown in FIG. 2) are beveled to prevent snagging. Large wheels 19, preferably provided with rubber tires, are fixed to the outer ends of axle 17 and are close to the sides 16. The wheels 19 normally carry most of the load and it is noted by comparison of FIGS. 1 and 2 that the wheels 19 support the load when either the larger end 12 or the shorter end 13 is downmost. It is sometimes desirable to brake wheels 19. One means is illustrated comprising a transverse bar 41 extending through slots 42 in reinforcement 18. A rod 43 slideable in brackets 44 on the gack of end 12 is fixed at one end to brake bar 41 and at the other end to L-shaped toggle latch 46 which is pivotted to end 12. By pivoting latch 46, bar 41 may be brought into contact with wheel tires 19 to set the brakes. Latch 46 may be sprung outward and over latch pin 47 projecting from end 12 to hold the brakes set. Stop 48 projecting from end 12 prevents latch 46 from pivotting in the wrong direction.

Fixed to the back of larger end 12 and projecting beyond the same is a U-shaped handle 21 which is normally used in moving the load on level ground and for tilting and lifting the cart. Auxiliary shorter handles 22 are fixed to the back of larger end 12 about one-third of the distance down from the outer end. Preferably, there are two handles so that both may be gripped for lifting the cart as hereinafter explained. Similarly, there are two handles 23 disposed transversely on the back of the shorter end 13 about one-third of the distance down from the outer end thereof. These handles are used for a similar purpose.

Adjacent the outer end of larger end 12 and on either side thereof are heavy-duty revolving casters 26. Similarly, revolving casters 27 are located adjacent the outer corners of the shorter end 13. Casters 26 and 27 cooperate with wheels 19 in transporting the load.

Optionally, padding 28 may be applied to the insides of sides 16 and the inside of lower end 13 to protect the contents of the cart from scratching and to cushion shocks. Padding 28 may be applied to other portions of the dolly 11. The panels 12, 13 and 16 may be of heavy plywood or metal. Although the panels are shown solid, various openings may be cut therein to reduce weight and to facilitate strapping the apparatus being transported.

Directing attention to FIG. 3, the fact that a single man may load or unload a heavy piece of equipment such as a combination television, hi-fi 31 is shown. As a preliminary step, with the cart parked with the longer end 12 downmost adjacent the object 31, the object 31 is tilted with the left-hand legs upward. This can ordinarily be performed by one man. With the object 31 raised in the tilted position shown, the cart 11 may be skidded under the equipment and the left-hand legs brought to rest on the panel 12. Thereupon, preferably with brake bar 41 set, the opposite legs are raised and the set is slid against the inside of 31 and rests on its feet on the end 12. It will be understood that larger apparatus may extend beyond the outer margin of end 12. Also, shorter and smaller objects may be handled. A strap 32 is then strapped around the set and end 12 and fastened with a buckle 33 or other means. Thereupon, the handle 21 may be raised, tilting the cart so that it may be transported only on the wheels 19 or wheels 19 and casters 27 or wheels 19 and casters 26. To unload the operation is reversed.

Directing attention now to FIG. 4, the use of the device in loading or unloading from a truck 36 is shown. With the shorter end downmost, the cart is moved as close to the opening in the truck 36 as possible and is then tilted to the position illustrated in FIG. 4. Thereupon, the user grabs the handles 23 and raises the wheels 19 off the ground until the casters 26 rest on the bed of the truck 36. Thereupon, the cart and its contents are slid into the truck. Ordinarily an operation such as this requires two men, but a single man may perform the operation using the cart of the present invention. Once in the truck, the cart aids in the prevention of tilting or movement during transportation. To unload from the truck, the operation is simply reversed.

Figure 5:
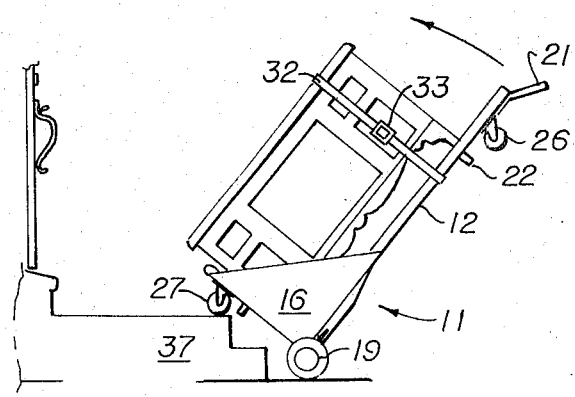
FIG. 5 is still another schematic elevational view showing the cart used to move equipment up or down steps.

FIG. 5 illustrates how the dolly 11 is used to negotiate a few steps 37. With the shorter end downmost, the handle 21 is used to move the wheels 19 as close to the bottom step as possible. Thereupon, the user pushes up on the handle 21, causing the casters 27 to rest upon the top step and the cart is pushed to the left, as viewed in FIG. 5, until the wheels 19 engage the topmost step. The reverse operation is likewise easily performed.

Figure 6:
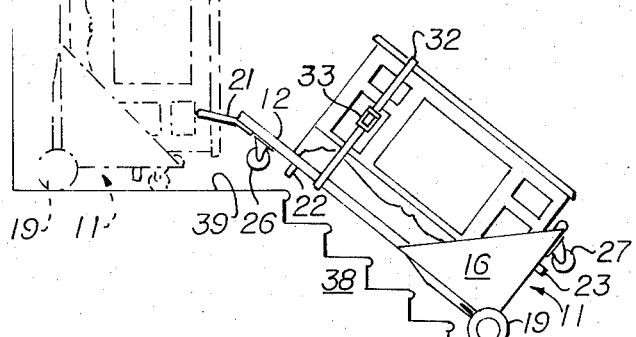
FIG. 6 is a schematic view showing the cart used to move equipment up or down stairs and also showing how it is useful in negotiating narrow passages.

FIG. 6 shows the device used to negotiate higher steps 38. These steps are of the type commonly encountered in mobile homes. Delivering and removing heavy equipment, such as television and hi-fi's and combinations, is extremely difficult in mobile homes because of the high steps and the narrow passageways inside. As shown in FIG. 6, in this installation the cart 11 approaches the stairs 38 with the longer end 12 closest to the stairs. With the wheels 19 as close to the bottom stair as possible, the handles 21 and 22 are pulled upwards, causing the cart to move up the stairs, the wheels 19 bearing some of the load. When the cart reaches the dot-and-dash line position of FIG. 6, it is resting on the wheels 19 and casters 27. The handle 21 is easily grasped by the user and by reason of the fact that the casters 27 revolve, the load may be easily turned to negotiate narrow passageways such as is indicated by reference numeral 39. The negotiation of the stairs 38 downwardly is even more easily accomplished than the upward passage.

Accordingly, the present invention provides a cart which by simply tilting and pushing will enable one man to negotiate 1 to 3 steps without the user turning around to pull the load up the steps and into an entrance way. In the upright position, the cart negotiates tight corridors since it is easy to maneuver. In normal upright position, the cart is in the position of FIG. 2, tilted slightly backward with the load supported only by wheels 19, and with the cart propelled and guided by handle 21.

What is claimed is:

1. A cart having a longer end, a shorter end at right angles to said longer end joined at a transverse corner, triangular sides permanently fixed to said ends on each side of said dolly extending from the outer end of said shorter end across said transverse corner, said sides holding said ends in said right-angle relation to each other and also preventing objects on said cart from falling off the sides, said ends and said sides comprising flat, thin sheets of material, said sheets being substantially impervious throughout most of their areas, an axle adjacent said corner, wheels on the ends of said axle, a first pair of casters on the back of said longer end adjacent the outer end of said longer end, a second pair of casters on the back of said shorter end adjacent the outer end of said shorter end, at least one first handle on the back of said longer end inward of said first pair of casters, at least one first handle on the back of said shorter end inward of said second pair of casters, and a U-shaped second handle fixed to and projecting outward beyond the outer end of said longer end.

2. A cart according to claim 1 in which said longer end is about twice the length of said shorter end.

3. A cart according to claim 1 which further comprises brake means on said cart engageable and disengageable with said wheels.

4. A cart having a longer end, a shorter end at right angles to said longer end joined at a transverse corner, an axle adjacent said corner, wheels on the ends of said axle, a first pair of casters on the back of said longer end adjacent the outer end of said longer end, a second pair of casters on the back of said shorter end adjacent the outer end of said shorter end, at least one first handle on the back of said longer end inward of said first pair of casters, at least one first handle on the back of said shorter end inward of said second pair of casters, a U-shaped second handle fixed to and projecting outward beyond the outer end of said longer end, triangular sides fixed to said ends on each side of said cart extending from the outer end of said shorter end across said transverse corner, and padding on the insides of said shorter end and sides.

* * * * *